Sept. 29, 1953
W. H. GILLE
2,654,061
LIMIT SWITCH CENTERING APPARATUS
Filed April 5, 1951
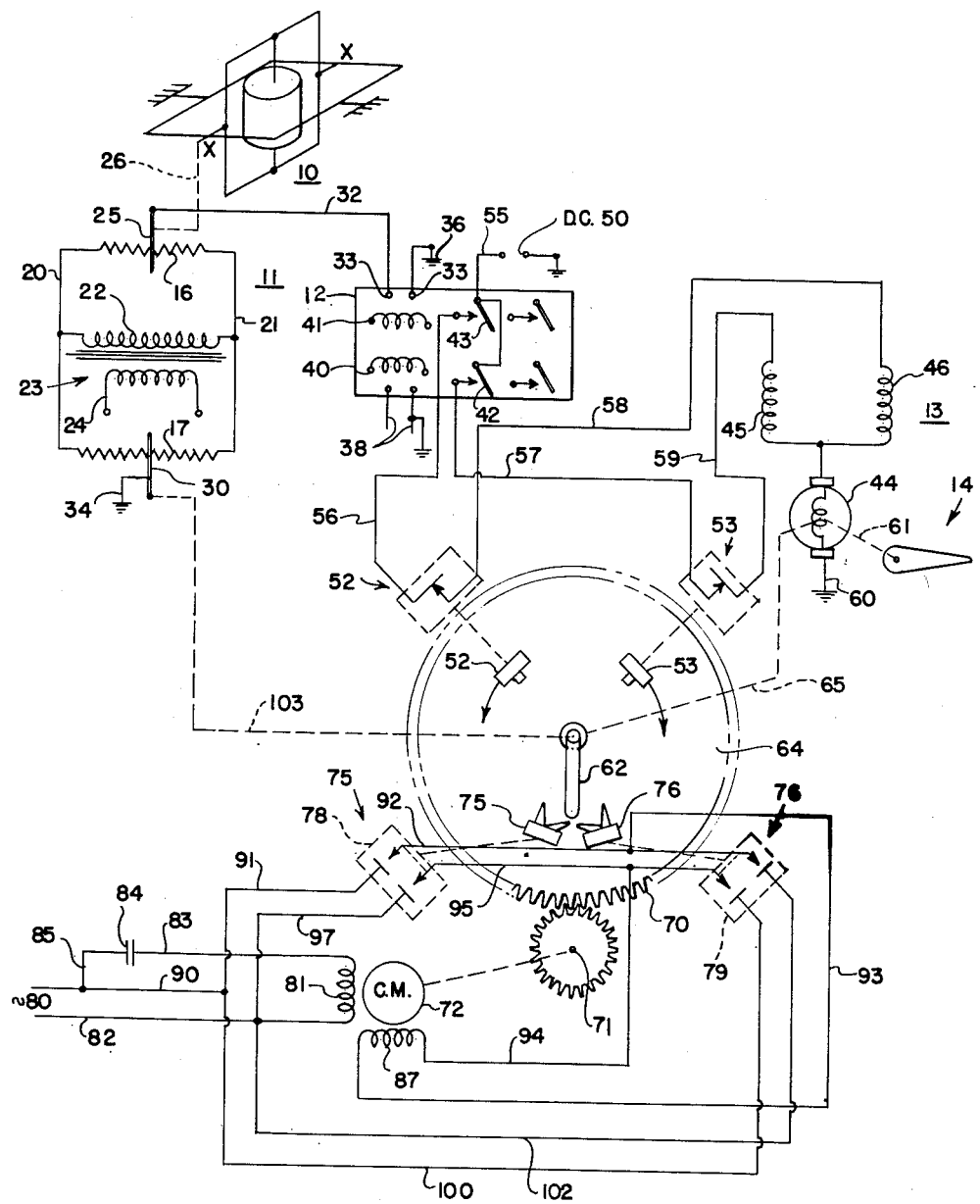
INVENTOR.
WILLIS H. GILLE
BY
George H Fisher
ATTORNEY.

Patented Sept. 29, 1953

2,654,061

UNITED STATES PATENT OFFICE 2,654,061

LIMIT SWITCH CENTERING APPARATUS

Willis H. Gille, St. Paul, Minn., assignor to Minneapolis-Honeywell Regulator Company, Minneapolis, Minn., a corporation of Delaware Application April 5, 1951, Serial No. 219,483

15 Claims. (Cl. 318—18)

My invention relates to servomotor control apparatus and more particularly to an adjustable limit switch arrangement for centering the limit switches about any point within the range of operation of the servomotor.

A servo mechanism of which the servomotor forms a part is a system which performs automatically a controlling or regulating function in accordance with a given command. The servomotor which performs a working function of such a system generally has a limited range of operation which is controlled by a balanceable network. To protect against physical damage to the servomotor and its associated parts as well as to the apparatus controlled or operated by the servomotor, means are generally provided to limit the range of movement of the servomotor, sometimes in the form of mechanical stops or electrical limit switches included in the energization circuit of the servomotor and more often in the form of both mechanical stops and electrical limiting devices.

In the field of aircraft control wherein the use of the subject invention is most applicable, limit switches are employed to limit the operation or displacement of the servomotor to relatively small ranges of movement with respect to the total displacement available from the servomotor and the control surfaces of the aircraft which they operate. This is done to guard against undue strain on the aircraft structure at high airspeeds and to prohibit the aircraft from attaining dangerous attitudes. In certain aircraft, because of the wide range of speed of which they are capable of attaining, it has been necessary to employ a plurality of pairs of limit switches to provide for varying displacements of the servomotor depending upon the speed at which the aircraft is traveling to maintain this safeguard of aircraft structure and attitude while still retaining adequate control of the aircraft. Further because the normal or trim position of the aircraft varies with weight distribution and also speed, causing changes in the normal position of the control structure and servomotor which positions the control surfaces, it is desirable to adjust the position of the limit switches so that the servomotors will be capable of an equal displacement of movement to either side of the newly assumed normal position. It is therefore an object of this invention to provide apparatus for centering the limit switches of a servomotor about any point of position the servomotor may assume within its range of operation.

It is further an object of this invention to provide in apparatus of this type an adjustable limit switch assembly and a centering motor for repositioning said assembly upon a change in the operating conditions of the servomotor.

It is also an object of this invention to provide a limit switch centering apparatus which is controlled by the servomotor upon a departure from its normal position.

These and other objects of this invention will become apparent from a reading of the attached specification together with the drawing which shows a schematic disclosure of the subject invention.

The limit switch centering apparatus of the subject invention is generally applied to aircraft control systems and is shown in the drawing in connection with a single channel (elevator) of an automatic pilot or control for aircraft. Further the limit switch centering apparatus is particularly applicable in an aircraft control system in which a plurality of pairs of limit switches are used to control the effective operating range of the servomotor depending upon the speed of the aircraft, the switches being selectively inserted into the servomotor energzing circuit by means of a device responsive to airspeed of the aircraft. Such an arrangement is shown in the co-pending application of Benjamin Ciscel, Serial No. 204,924, filed January 8, 1951, but since his arrangement forms no part of the subject invention, it is omitted here for simplicity.

The automatic pilot system or servo mechanism shown in the drawing to illustrate the subject invention consists of a command station or vertical gyroscope 10, a network 11, an amplifier 12, a servomotor 13, and a controlled member 14 in the form of an elevator control surface for an aircraft. Network 11 is shown in the form of a Wheatstone bridge comprising a resistance element 16 and a resistance element 17 connected together at their extremities by conductors 20, 21 and energized from the secondary winding 22 of a transformer 23, the secondary winding being connected in a parallel relationship with the resistors 16 and 17 to the conductors 20, 21. Transformer 23 has a primary winding 24 which is adapted to be energized from an alternating curent source of power. Cooperating with resistor 16 is a wiper 25 which with resistor 16 forms a potentiometer adapted to be operated by displacement of the vertical gyroscope 10 about its pitch axis by means of a connection 26. The details of gyroscope 10 are eliminated herein with the gyroscope being shown schematically. However it is to be noted that the gyroscope is conventional in design having a pitch axis which is mounted normal to the longitudinal axis of the ship or aircraft upon which it is attached and of which it is adapted to control. This gyroscope when so mounted and properly energized will remain substantially vertical in space and upon tilt of the aircraft in the pitch attitude will cause rotation of the gyroscope relative to the aircraft about the pitch axis of the gyroscope causing movement of the wiper 25 through the connection 26 along the resistor 60 to provide a signal to the network in proportion to the amount of pitch of the aircraft. Similarly resistor 17 has cooperating therewith a wiper 30 to form a potentiometer which is known as the balancing potentiometer of the network, the wiper 30 being connected to the servomotor 13 in a manner later to be described. While the present disclosure is schematic, it is to be understood that normally the pitch potentiometer would be carried by and mounted on the vertical gyroscope and the balance potentiometer carried by and mounted on the servomotor such that the respective wipers of these potentiometers will be actuated by relative movement of these devices with respect to the aircraft. It is also to be understood that the network would normally be more involved, including potentiometers adjusted to accordance with desired trim and other factors.

Network 11 is electrically connected to amplifier 12 by means of a conductor 32 which connects the wiper 25 of the pitch potentiometer to one of the signal input terminals 33 of the amplifier. Similarly the wiper 30 of the balance potentiometer is grounded as at 34 to complete the circuit in a manner later to be described. Amplifier 12 is shown schematically in the drawing in block form. This amplifier is of the type which will operate a pair of discriminating relays in response to phase reversal of the input signal received thereto. Reference is made to the Gille Patent No. 2,425,734 issued August 19, 1947, for a disclosure of such a device. The circuit between the network 11 and amplifier 12 is completed through a grounded connection of the other of signal input terminals 33, the ground connection being indicated at 36. The circuit for this input circuit is as follows: wiper 25 of pitch potentiometer to conductor 32, input terminals 33 of amplifier 12, grounded input terminal 36 of amplifier 12, to grounded connection 34 of wiper 30, to resistor 17 of bridge network 11, through conductors 20 and 21 to resistor 16 of the pitch potentiometer. The transformer 23 energizes this circuit which is a conventional Wheatstone bridge arrangement, the signal output of the bridge network 11 being controlled by the relative position of the wipers 30 and 25 on the pitch and balance potentiometers and being of the type which is reversible in phase and magnitude. Amplifier 12 is also supplied with an A. C. power source indicated at 38. This amplifier is shown to include relays 40, 41 having contact mechanisms 42, 43 respectively which are selectively operated by the amplifier depending upon the output of the network 11.

The relays 40, 41 of amplifier 12 control the energization circuit for servomotor 13, the servomotor being shown schematically as a conventional D. C. motor design having a pair of directional field windings 45, 46 and an armature 44. Motor 13 is energized from a D. C. source of power 50 one side of which is grounded at 51, the energization circuit for the motor including a pair of limit switches 52, 53 which are operated by the servomotor 13 to limit rotation thereof. This energization circuit is as follows: D. C. source 50, conductor 55, to a common contact of switches 42, 43, the cooperating contacts of switches 42, 43 through one or the other of conductors 56, 57 to one or the other of switches 52, 53, conductors 58 or 59, through one or the other of the field windings 45, 46, through armature 44 to a ground connection 60. The direction of rotation of the servomotor 13 is controlled by the operation of the relays 40, 41 through its contacts 42, 43 which selectively places one or the other of the directional field windings 45, 46 in series with the armature 44 and the D. C. source of power. The limit switches 52, 53 are designed to limit rotation of the servomotor by opening the energization circuit after the servomotor has rotated a predetermined distance in either direction.

Servomotor 13 has a connection indicated schematically at 61 to the control surface or elevator 14, this connection being usually in the form of a cable drum and cable assembly for actuating the control surface through the servomotor. Also connected to the shaft of the servomotor is a cam 62 which is adapted to operate the limit switches 52, 53, shown schematically in the drawing as a pair of snap acting switches. The limit switches 52, 53 are mounted on an adjustable plate 64, shown schematically in the drawings, which is adapted to be pivotally or adjustably mounted on the servo 13. Plate 64 mounts the limit switches 52, 53 stationarily thereon, the limit switches being positioned relative to the normal position of the cam 62 which is connected to the armature 44 of motor 13 by means of a shaft indicated at 65 such as to be spaced or displaced an equal distance to either side of the normal position of the cam and hence the servomotor. This normal position corresponds with the trim position of the elevator 14 of the aircraft for a particular airspeed. The cam which is connected to the armature 44 rotates therewith and upon engagement with the limit switches operates the same to open the circuit therethrough. The displacement of the limit switches 52, 53 from the normal position is relatively small in comparison to the normal allowable or available rotation of the servomotor and the displacement of the control surface 14. This arrangement is provided to protect the aircraft from undue strain caused by wide displacement of the control surface at relatively high speeds and further protect against undue attitude change of the aircraft should the control surface be widely displaced by the servomotor. It should also be understood that other limit switches or devices are to be employed to protect the motor proper and its gear train and associated electrical apparatus mounted thereon, these limit switches being positioned to properly function near the end of the total allowable range of displacement of the servomotor and not being carried by the plate 64 or adjusted relative to the servomotor. When electrical limit switches are used for the ultimate limiting device, they are also included in the energization circuit for the servomotor, but since such apparatus form no part of the subject invention they are omitted here for simplicity.

Switch mounting plate 64 is shown in the drawings as having a geared periphery indicated at 70 which geared periphery cooperates with a pinion 71, normally mounted on the servomotor, the pinion being driven by a centering motor 72. The centering motor is shown in the drawing as a split-phase or two-phase A. C. induction motor. This centering motor is adapted to be a slow speed device or to incorporate the high ratio of gearing such as to have a slow ultimate speed of rotation for driving the pinion 71 as compared with the speed of rotation of servomotor 13 which is evidenced by the rotation of the cam 62 and movement of the control surface 14. The centering motor although not specified in the drawings would also be mounted on these servomotor housings to cooperate with the pinion and the adjustable plate for rotating the limit switches thereon relative to the cam 62 which is mounted on the armature 44 of the servomotor 13. The operation of the centering motor is such as to slowly position the plate 64 and hence the switches 52 thereon relative to the cam 62 of the servomotor which operates the same.

The centering motor 72 is controlled by a pair of switches 75, 76 which are similarly mounted on the plate 64. The switches 75, 76 are shown schematically as overcentered type contactors having an operating lever member adapted to be engaged in one direction or the other to move the switch from an open to a closed position. The switches have a pair of contacts which are simultaneously opened and closed depending upon the operation of the toggle of the switch. The contacts of the switches 75, 76 are shown at 78 and 79 respectively, the contacts of each switch being simultaneously operated but electrically independent of one another. The switches 75, 76 are so mounted on the plate 64 as to be closely positioned to either side of the normal position of the cam 62 such that as the servomotor and hence the control surface 14 departs from the normal twin position, the cam 62 will engage one or the other of the levers of the switches 75 or 76 to operate the same. The switches control the energization of the centering motor 72 from a single phase source of power 80 such that the operation of the motor 72 may be reversible depending upon which of the switches 75 or 76 is operated. Motor 72 has a line winding 81 which is connected directly across the A. C. source 80 by means of a conductor 82 leading to the winding 81 and the conductor 83 connecting the opposite end of winding 81 to a condenser 84 whose extremity is connected through a conductor 85 back to the source 80. The other phase winding 87 of motor 72 is connected to the source of power through one or the other of switches 75 or 76 in the following circuits. With switch 75 closed, the circuit for the energization of winding 82 is as follows: source 80, conductor 90, conductor 91, one of the contacts 78 of switch 75, conductor 92, conductor 93, winding 87, conductor 94, conductor 95, the other contact 78 of switch 75, conductor 97, to conductor 82, and source 80. The circuit for the winding 87 through the switch 76 is as follows: source 80, conductor 90, conductor 100, one of the contacts 79 of switch 76, conductor 94, winding 87, conductor 93, the other of the contacts 79 of switch 76, conductor 102, conductor 82, to source 80. Thus when one or the other of the switches 75 or 76 is closed, the centering motor will be energized for a given direction rotation which direction of rotation will be such that the pinion 71 will rotate the plate 64 in the same direction of the rotation of the cam 62 thereby displacing the limit switch 52 or 53 which the cam is approaching further from engagement with the cam. The purpose of this operation will become evident from the following description of the operation of the apparatus.

In general the operation of the gyroscope 10, network 11, amplifier 12 and servomotor 13 are conventional with automatic aircraft control procedure. Any disturbance impressed on the aircraft about the pitch axis causes relative displacement of the plane with respect to the gyroscope 10 which is fixed in space causing the wiper 25 to move relative to the resistance 16 unbalancing the bridge network 11. The network 11 upon displacement of the pitch potentiometer will cause a signal to be fed to the amplifier 12 which signal depending upon its phase and magnitude will operate one or the other of the relays 40, 41 to control the energization circuit for the servomotor 13. The limit switches 52, 53 in this energization circuit are normally closed and will not be opened, unless operated by the cam driven by the servomotor. Hence the closure of one of the contacts 42, 43 of one of the relays 40, 41 will energize one or the other of the field windings 45, 46 and the armature 44 of the servomotor 13 from the D. C. source 50 causing the servomotor to displace the control surface 14 of the aircraft. Simultaneously with this displacement of the control surface, there will be a rotation of the cam 62 of the limit switch assembly and the wiper 30 of the balancing pot assembly which is driven by the servomotor through a connection indicated at 103. Immediately upon the departure of the servo from its normal position, one or the other of the switches 75 or 76 is operated to energize the centering motor causing the switch mounting plate 64 to be rotated by the pinion 71. However, as previously pointed out, the speed of rotation of the servomotor at its output shaft is relatively large in comparison to the movement of the pinion 71 by the centering motor 72. The displacement of the control surface by the servomotor causes the aircraft to change its attitude in a conventional manner repositioning the gyroscope relative to the aircraft and hence moving the wiper 25 relative to the resistor 16 of the balancing potentiometer. Thus as the servomotor is being operated to reposition the aircraft, the aircraft will be responding in a direction such as to move the wiper 25 towards its normal position and the wiper 40 of the balancing potentiometer away from its normal position. At some point in its operation, the network 11 will change in phase and magnitude causing the amplifier to be operated to deenergize the relay previously energized and energize the opposite relay causing a reversal in direction of rotation of the servomotor. This will cause a reversal in the direction of rotation of the control surface and hence the cam 62 and wiper 30 bring these respective parts back to the normal position as the original attitude of the aircraft is approached and attained. The centering motor in the meantime has been operating independently of this change in aircraft attitude and of this reversal in operation of the servomotor and until the cam 62 reengages the switch 75 or 76 which has previously operated to open its contacts the centering motor will continue to maintain this direction of rotation. However, as the servomotor 13 and hence the cam 62 approaches its original or normal position, the cam will engage one of the switches to open the contacts previously closed and continuing further will engage the opposite switch to close its contacts causing the centering motor to reverse its direction of rotation and reposition the plate 64 in the direction of rotation of the servomotor as evidenced by the cam 62. This rotation of the centering motor will continue until the second named control switch for the centering motor has again been operated to open its contacts evidencing the fact that the plate 64 has been rotated such that the cam 62 is now positioned between the switches 75 and 76 at which point the centering motor will be deenergized.

It should be noted that because of the relationship in speed between the cam 62 and the plate 64 as driven by the centering motor 72, it is possible for the cam to go beyond the controlling switches 75 and 76 of the centering motor and approach the position of the limit switches 52, 53 mounted on the plate 64 even though the plate is being slowly rotated by the centering motor away from the direction such as to move the limit switches away from the cam. If the unbalance of the bridge network has been great indicating an unusual change in the attitude of the aircraft, and the response of the aircraft due to the displacement of the control surface 14 has not been such as to rapidly bring the aircraft back to its original flight attitude, it is possible for the cam 62 to engage one or the other of the limit switches 52, 53 depending upon its direction of rotation. This would indicate an excessive correction is being implied by the servomotor for the particular airspeed for which the limit switches have been positioned and the servomotor would be deenergized. However, continued change of the aircraft attitude due to control surface displacement would eventually adjust the bridge such that the opposite control or amplifier relay would be energized causing the servomotor to rotate in the opposite direction taking the cam 62 away from the limit switch which was then not in the energizing circuit. Under these conditions the aircraft would slowly return to its normal position. In such manner the control surfaces and the cam 62 would return to a normal position. Similarly the centering motor since it is controlled by the position of cam 62 with respect to the switches 75, 76 would be operated by the movement of the cam past one switch to open the same and past the other to close it such that the centering motor would rotate the disk back toward its normal position and leave it centered with the cam located between the limit switches when the centering motor 72 is finally deenergized.

Under certain conditions such as change in distribution of weight within an aircraft caused by consumption of fuel, dropping of bombs or movement of personnel within, the particular flight attitude for a given airspeed will change necessitating a deflection of the control surface and to maintain the particular desired flight attitude, such as level flight. With the apparatus as shown in the drawing a change in attitude of the aircraft is required to maintain the desired flight attitude inasmuch as the movement of the slider 20 on the rebalancing potentiometer must be offset by an equal and opposite movement of slider 25 on the vertical gyroscope potentiometer to bring the network to a balanced condition and deenergize the servomotor. It is to be understood, however, that normally an autopilot system network would include a trim adjustment potentiometer which would be adjusted manually or automatically to supply the network with an equal and opposite signal to that created by the rebalancing potentiometer under these conditions, thereby permitting the aircraft attitude to remain constant and the slider of the vertical gyroscope potentiometer to remain in its normal position for that plane attitude. However, since this disclosure is intended to be illustrative only and the details of the autopilot network form no part of the subject invention, only the most simplified disclosure of the autopilot network has been shown herein. With the relationship of parts described above, the bridge network under these conditions will again be balanced, but the cam 62 will no longer bear the same relationship to the stationary portion of the servomotor structure. Hence the limit switches which are mounted on the plate 64 will be moved by virtue of movement of the plate 64 through control of the switches 75, 76 so that the plate will take up a new normal position within which the cam 62 will be centered between the switches 75, 76 and the limit switches 52, 53 mounted thereon will be equally displaced from the operating end of the cam 62. Under these conditions it will be noted that the network will have attained a new control point or will have shifted its control point and the limit switches which determine the permissive rotation of the servomotor for a particular airspeed will be adjusted so that the servomotor and hence the control surface 14 can be equally displaced from this new control point or control position in either direction for desired changes in attitude before the limit switches which govern the same will be engaged.

It is to be understood that the above disclosure is intended to be illustrative only and that changes may be made in the limit switch controlling circuit and the controlling devices while retaining the advantages of the subject invention. Therefore the scope of the invention should be determined only by the appended claims.

I claim as my invention:

1. In control apparatus for a condition changing means, in combination, a condition changing means, power means for operating said condition changing means, control means for said power means including a controller and a follow-up mechanism having a follow-up action corresponding to a predetermined change in the value of the condition to which said controller responds, connections between said power means and said follow-up mechanism for operating said follow-up mechanism, position limiting apparatus disposed at predetermined distances to either side of a normal position for said power means to limit the range of operation of said power means, and a second power means connected to said position limiting apparatus and controlled by the operation of said first named power means to maintain said predetermined disposition of said position limiting apparatus with respect to said power means as the normal position of said power means changes.

2. In control apparatus for a condition changing means, in combination, a condition changing means, power means for operating said condition changing means, control means for said power means, position limiting apparatus included in said control means and disposed at predetermined distances to either side of a normal position for said power means to limit the range of operation of said power means, and a second power means connected to said position limiting apparatus and controlled by the operation of said first named power means to maintain said predetermined disposition of said position limiting apparatus with respect to said power means.

3. In control apparatus for a condition changing means, in combination, a condition changing means, an electric motor means for operating said condition changing means within a predetermined range of operation, electric circuit control means for controlling the energization of said motor means, limit switch means included in said electric circuit control means and mounted on an adjustable disk to be operated by said motor means upon displacement of said motor means a given distance to either side of a normal position to limit the range of operation of said motor means, second motor means geared to said disk mounting said limit switches for rotating said disk and said switches relative to said first named motor means, and control means operated by the operation of said first named motor means for controlling the operation of said second named motor means.

4. In control apparatus for a condition changing means, in combination, a condition changing means, an electric motor means for operating said condition changing means within a predetermined range of operation, electric circuit control means for controlling the energization of said motor means, limit switch means included in said electric circuit control means and mounted on an adjustable disk to be operated by said motor means upon displacement of said motor means a given distance to either side of a normal position to limit the range of operation of said motor means, second motor means geared to said disk mounting said limit switches for slowly rotating said disk with said limit switches thereon, and a pair of override type switches positioned on said disk and adapted to be operated by said first named motor means upon departure from said normal position for controlling the energization of said second named motor means.

5. In control apparatus of the type described, in combination, a reversible servomotor adapted to operate over predetermined ranges of movement at a substantially fixed speed of operation to either side of a normal position, control means for said servomotor, limit switch means included in said control means for limiting the operation of said servomotor to said predetermined ranges of movement, and motor means controlled by the operation of said servomotor for adjustably positioning at a substantially slower speed of operation than said servomotor said limit switch means to maintain said predetermined ranges of operation of said servomotor upon a change of said normal position of said servomotor.

6. In control apparatus of the type described, in combination, a reversible servomotor adapted to operate over predetermined ranges of movement at a substantially fixed speed of operation to either side of a normal position, control means for said servomotor including a controller and a follow-up mechanism having a follow-up action corresponding to said range of movement of said servomotor, limit switch means included in said control means for limiting the operation of said servomotor to said predetermined ranges of movement, and means including a motor means actuated by said servomotor upon a departure of said servomotor from said normal position for adjustably positioning at a substantially slower speed of operation than said servomotor said limit switch means to maintain said predetermined range of operation of said servomotor upon a change of said normal position of said servomotor.

7. In control apparatus of the type described in combination, a reversible servomotor adapted to operate over predetermined ranges of movement at a substantially fixed speed of operation to either side of a normal position, control means for said servomotor including a controller and a follow-up mechanism having a follow-up action corresponding to the total range of movement of said servomotor, limit switch means included in said control means and operated by said servomotor to limit the operation of said servomotor to said ranges of movement, further switching means operated by said servomotor upon a departure of said servomotor from said normal position, and means controlled by said further switching means to shift the ranges of movement of said servomotor to either side of said normal position upon a sustained departure of said servomotor from said normal position.

8. In a device of the class described, in combination, a reversible servomotor, means energizing said servomotor to cause said servomotor to operate over a fixed range to either side of a normal position, control means for controlling said energizing means including a controller having a normal control point corresponding to said normal position of said servomotor and a follow-up mechanism having a follow-up action corresponding to the range of operation of said servomotor, limit switch means included in said control means and mounted about an adjustable plate for operation by said servomotor at predetermined points in its range of operation, centering motor means connected to said plate for adjustably positioning said disk and said limit switch means relative to said servomotor, and a second control means for controlling the energization of said centering motor means so mounted on said disk that it is continuously operated by said servomotor upon very small displacement of said servomotor from said normal position, said centering motor means being adapted to reposition said limit switch means with respect to said normal position of said servomotor upon a change of said normal control point of said controller.

9. In a device of the class described, in combination, a reversible servomotor, means energizing said servomotor to cause it to operate over a fixed range to either side of a normal position, control means for controlling said energizing means including a controller having a normal control point corresponding to said normal position of said servomotor and a follow-up mechanism having a follow-up action corresponding to said range of operation of said servomotor, limit switch means included in said control means for terminating the energization of said servomotor at predetermined points within said range of operation of said servomotor, said limit switch means including a switch member and a cam member adapted to be operated by said servomotor to engage said switch member to operate the same, means including a centering motor means for adjustably repositioning one of said members relative to the other of said members to shift the position within said range of operation of said servomotor at which operation of said switch member takes place, and second control means operated by said servomotor upon any departure of said servomotor from said normal position to control the operation of said centering motor means.

10. In a device of the class described, in combination, a reversible servomotor, means energizing said servomotor to cause it to operate over a fixed range of movement to either side of a normal position, electrical circuit control means for controlling said energizing means including a controller having a normal control point corresponding to said normal position of said servomotor and a follow-up mechanism operated by said servomotor having a follow-up action corresponding to the range of movement of said servomotor, electrical limit switch means included in said control circuit means and mounted on an adjustable plate for operation by said servomotor at predetermined points within its range of movement to terminate the energization of said servomotor, centering motor means geared to said plate for adjustably positioning said disk and said limit switch means relative to said servomotor, and second switching means including a pair of override type switches positioned to either side of a point corresponding to said normal position of said servomotor for controlling the energization of said centering motor means, said second switching means being operated by said servomotor upon a very small displacement of said servomotor from said normal position, said centering motor means being adapted to gradually reposition said limit switch means with respect to said normal position of said servomotor upon departure of said servomotor from said normal position.

11. In control apparatus for a condition changing means in combination, a condition changing means, power means for operating said condition changing means within a predetermined range of movement, electric circuit control means for controlling the operation of said power means within said predetermined range of movement, a pair of position limiting devices included in said electric circuit control means and disposed to be normally spaced equidistantly from a cam on said power means which operates said devices, and a slowly operated motor means for repositioning said pair of limiting devices upon operation of said power means to maintain said predetermined disposition of said limiting device with respect to said cam on said power means.

12. In control apparatus for a condition changing means in combination, a condition changing means, a reversible servomotor connected to said condition changing means and adapted to be operated over a predetermined range of movement at a substantially fixed speed of operation to either side of a normal position, electric circuit control means for said servomotor, limit switch means included in said electric circuit control means for limiting the operation of said servomotor to said predetermined ranges of movement, and a slowly operated motor means controlled by the operation of said servomotor for varying the position of operation of said limit switch means by said servomotor.

13. In control apparatus for a condition changing means, in combination, a condition changing means, a reversible servomotor connected to said condition changing means and adapted to be operated over predetermined ranges of movement at a substantially fixed speed of operation to either side of a normal position, electric circuit control means for said servomotor, a pair of position limiting devices included in said electric circuit control means and disposed to be normally spaced equidistantly from a cam on said servomotor which operates said devices, and a slowly operated motor means connected to said position limiting devices and adapted to vary the position of said devices to maintain said predetermined disposition of said devices relative to said cam, and means operated by said servomotor for controlling the operation of said slowly operated motor means.

14. In control apparatus of the type described, in combination, a servomotor, means energizing said servomotor to cause it to operate over a fixed range of movement to either side of a normal position, control means for controlling the energization of said servomotor, limit switch means included in said control means and disposed to be normally spaced equidistantly from a cam on said servomotor which operates said limit switches, a slowly operated motor means for modifying the effect of operation of said servomotor to maintain said predetermined disposition of said limit switch means with respect to said cam on said servomotor, and means operated by said servomotor for controlling the operation of said slowly operated motor means.

15. In control apparatus for a condition changing means in combination, a reversible servomotor adapted to be connected to a condition changing means to operate the same over a predetermined range of movement at a substantially fixed speed of operation to either side of a normal position, electric circuit control means for controlling the energization of said reversible servomotor, a position limiting assembly forming a part of said electric circuit control means and including relatively movable parts in a normally predetermined spaced relationship, means connecting said power means to one of said parts of said position limiting assembly, a slowly operated motor means connected to one of said parts of said position limiting assembly and adapted to maintain said predetermined spaced relationship between said parts of said position limiting assembly, and means operated by said servomotor for controlling the operation of said slowly operated motor means.

WILLIS H. GILLE.

References Cited in the file of this patent
UNITED STATES PATENTS

| Number | Name | Date |
|---|---|---|
| 2,221,311 | Hodgman | Nov. 12, 1940 |
| 2,340,174 | Chance | Jan. 25, 1944 |
| 2,376,513 | Shafer | May 22, 1945 |
| 2,441,149 | Hays, Jr. | May 11, 1948 |
| 2,448,167 | Baak | Aug. 31, 1948 |